United States Patent
Khalid et al.

(10) Patent No.: US 11,943,110 B2
(45) Date of Patent: Mar. 26, 2024

(54) AUTOMATED NETWORK GENERATION, VALIDATION AND IMPLEMENTATION IN A PRODUCTION ENVIRONMENT

(71) Applicant: Charter Communications Operating, LLC, St. Louis, MO (US)

(72) Inventors: Saran Khalid, Denver, CO (US); Perwaiz Akhtar, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 4 days.

(21) Appl. No.: 17/743,581

(22) Filed: May 13, 2022

(65) Prior Publication Data
US 2023/0370333 A1 Nov. 16, 2023

(51) Int. Cl.
| | |
|---|---|
| *H04L 41/0895* | (2022.01) |
| *H04L 41/0806* | (2022.01) |
| *H04L 41/122* | (2022.01) |
| *H04L 43/08* | (2022.01) |
| *H04L 43/10* | (2022.01) |

(52) U.S. Cl.
CPC ...... *H04L 41/0895* (2022.05); *H04L 41/0806* (2013.01); *H04L 41/122* (2022.05); *H04L 43/08* (2013.01); *H04L 43/10* (2013.01)

(58) Field of Classification Search
CPC ............. H04L 41/0895; H04L 41/0806; H04L 12/4641; H04L 43/50; H04L 43/08; H04L 43/10; H04L 41/122; H04L 43/062
See application file for complete search history.

(56) References Cited

U.S. PATENT DOCUMENTS

| | | | | |
|---|---|---|---|---|
| 10,305,764 | B1* | 5/2019 | Kshirsagar | H04L 41/40 |
| 11,070,432 | B2* | 7/2021 | Yeung | H04L 41/0893 |
| 2014/0047341 | A1* | 2/2014 | Breternitz | G06F 16/23 |
| | | | | 715/735 |
| 2017/0237655 | A1* | 8/2017 | Yang | H04L 61/5007 |
| | | | | 370/254 |
| 2018/0121222 | A1* | 5/2018 | Sharma | G06F 9/45558 |
| 2018/0375932 | A1* | 12/2018 | Gopinath | H04L 43/10 |
| 2019/0089780 | A1* | 3/2019 | Yousaf | G06F 9/45533 |
| 2019/0104047 | A1* | 4/2019 | Tejaprakash | H04L 43/50 |
| 2019/0199760 | A1* | 6/2019 | Arauz-Rosado | H04L 61/5007 |
| 2019/0223023 | A1* | 7/2019 | Altay | H04L 41/5051 |

(Continued)

FOREIGN PATENT DOCUMENTS

| | | | | |
|---|---|---|---|---|
| WO | WO-2021113110 A1 * | 6/2021 | ............. | H04L 12/24 |
| WO | WO2021113110 | * | 4/2022 | ........... H04L 41/342 |

*Primary Examiner* — Tonia L Dollinger
*Assistant Examiner* — Linh T. Nguyen
(74) *Attorney, Agent, or Firm* — Dority & Manning, P.A.

(57) ABSTRACT

Configuration information that identifies a plurality of components that define a network is received. Based on the configuration information, a plurality of virtual network function (VNF) instances are caused to be generated on a plurality of general-purpose computing devices to implement the network on the plurality of general-purpose computing devices, each VNF instance corresponding to one of the plurality of components. Based on the configuration information, at least some of the VNF instances of the plurality of VNF instances are configured. Testing data and testing criteria are obtained. The testing data is submitted to the network, and network test results based on the testing data and the testing criteria are output.

15 Claims, 6 Drawing Sheets

(56) References Cited

U.S. PATENT DOCUMENTS

2019/0342214 A1* 11/2019 Bogdanski ............ H04L 45/586
2020/0259741 A1* 8/2020 Park ...................... H04L 7/0041
2020/0267072 A1* 8/2020 Prasad ................... H04L 45/04
2020/0412596 A1* 12/2020 Cherunni ................ H04L 41/40
2021/0021444 A1* 1/2021 Barabash ............ H04L 12/4641

* cited by examiner

AUTOMATED NETWORK GENERATION, VALIDATION AND IMPLEMENTATION IN A PRODUCTION ENVIRONMENT

BACKGROUND

Large-scale production networks, such as those implemented by national service providers to service customers, often require the addition of sub-networks that may impact the large-scale production network.

SUMMARY

The embodiments disclosed herein implement automated network generation, validation and implementation in a production environment.

In one embodiment a method is provided. The method includes receiving, by a computing system comprising one or more processor devices, configuration information that identifies a plurality of components that define a network. The method further includes causing, by the computing system based on the configuration information, a plurality of virtual network function (VNF) instances to be generated on a plurality of general-purpose computing devices to implement the network on the plurality of general-purpose computing devices, each VNF instance corresponding to one of the plurality of components. The method further includes configuring, by the computing system based on the configuration information, at least some of the VNF instances of the plurality of VNF instances. The method further includes obtaining, by the computing system, testing data and testing criteria and submitting, by the computing system, the testing data to the network. The method further includes outputting network test results based on the testing data and the testing criteria.

In another embodiment a computing system is provided. The computing system includes one or more processor devices of one or more computing devices. The one or more processor devices are configured to receive configuration information that identifies a plurality of components that define a network. The one or more processor devices are further configured to cause, based on the configuration information, a plurality of virtual network function (VNF) instances to be generated on a plurality of general-purpose computing devices to implement the network on the plurality of general-purpose computing devices, each VNF instance corresponding to one of the plurality of components. The one or more processor devices are further configured to configure, based on the configuration information, at least some of the VNF instances of the plurality of VNF instances. The one or more processor devices are further configured to obtain testing data and testing criteria. The one or more processor devices are further configured to submit the testing data to the network. The one or more processor devices are further configured to output network test results based on the testing data and the testing criteria.

In another embodiment a non-transitory computer-readable storage medium is provided. The non-transitory computer-readable storage medium includes executable instructions configured to cause one or more processor devices to receive configuration information that identifies a plurality of components that define a network. The instructions further cause the one or more processor devices to, based on the configuration information, cause a plurality of virtual network function (VNF) instances to be generated on a plurality of general-purpose computing devices to implement the network on the plurality of general-purpose computing devices, each VNF instance corresponding to one of the plurality of components. The instructions further cause the one or more processor devices to configure, based on the configuration information, at least some of the VNF instances of the plurality of VNF instances. The instructions further cause the one or more processor devices to obtain testing data and testing criteria. The instructions further cause the one or more processor devices to submit the testing data to the network, and output network test results based on the testing data and the testing criteria.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
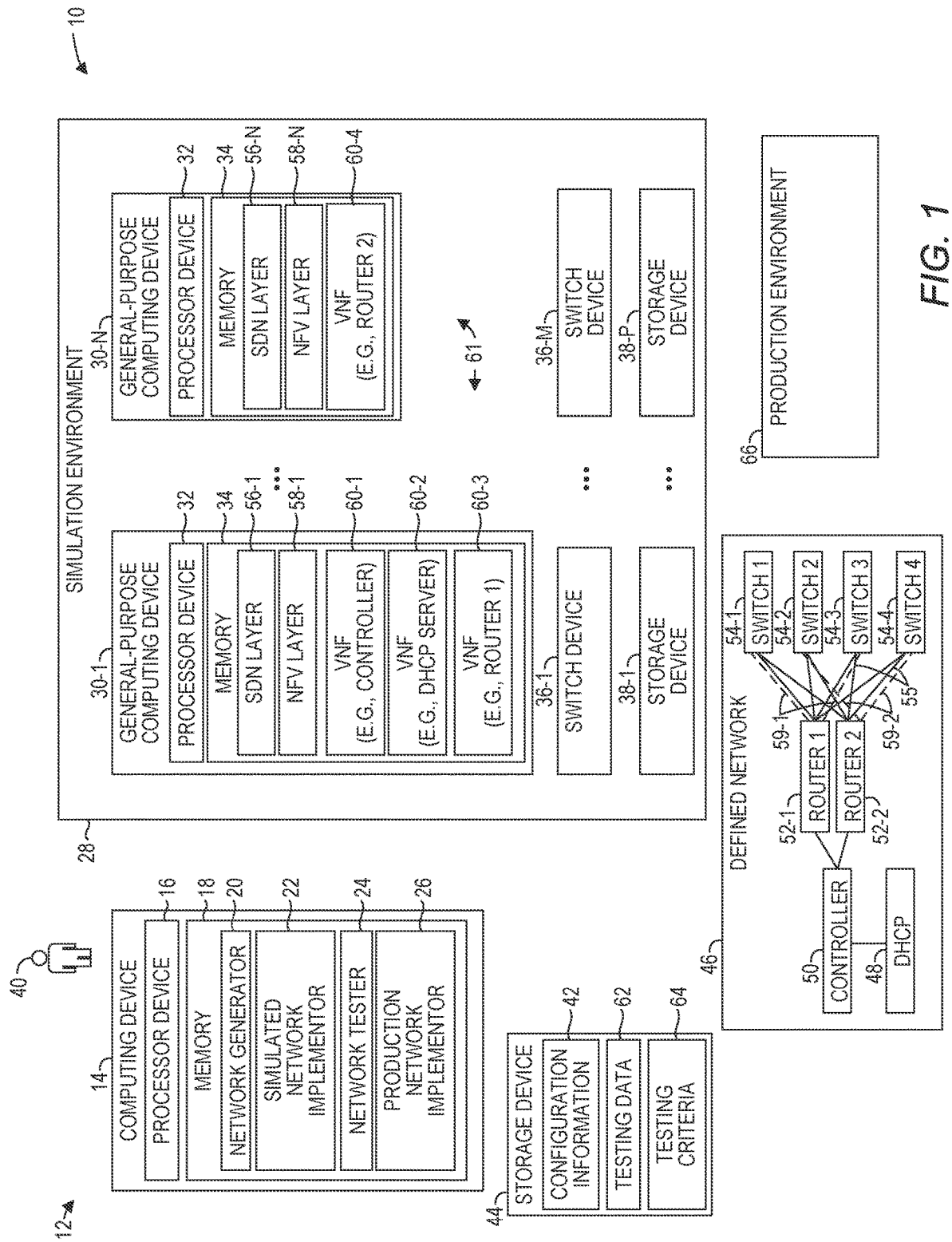
FIG. 1 is block diagram of an environment in which embodiments may be practiced.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Large-scale production networks, such as those implemented by national service providers to service customers, often require the addition of sub-networks that may impact the large-scale production network. A sub-network, however, may negatively impact the large-scale network if the sub-network is not properly designed. Accordingly, the sub-network may be implemented in a laboratory first, then tested, prior to implementation, in a production environment. This process is time-consuming and requires costly, specially skilled engineers who are a finite resource.

The embodiments disclosed herein implement automated network generation, validation and implementation in a production environment. The embodiments receive configuration information that identifies a plurality of components that define a network. In some implementations, the configuration information may be generated by a network simulator. A plurality of virtual network functions (VNFs) are caused to be generated on a plurality of general-purpose computing devices to implement the network on the plurality of general-purpose computing devices, each VNF corresponding to one of the plurality of components. Each VNF is then configured based on the configuration information. Testing data and testing criteria are obtained, and submitted to the network. Results of the testing data and the testing criteria are output, and based on the results, it may be determined that the network is ready for implementation in a production environment, or that the network needs to be modified prior to implementation in a production environment.

FIG. 1 is block diagram of an environment 10 in which embodiments may be practiced. The environment 10 includes a computing system 12 that comprises one or more computing devices 14. Each of the computing devices 14 include one or more processor devices 16 and a memory 18. The memory 18 may include one or more components, including, by way of non-limiting example, a network generator 20, a simulated network implementor 22, a network tester 24, and a production network implementor 26.

The environment 10 also includes a simulation environment 28, which includes a plurality of general-purpose computing devices 30-1-30-N (generally, computing device 30). The term "general-purpose" in this context refers to computing devices that are capable of implementing a desired functionality based on executable code files, rather than specialized computing devices that are manufactured to implement a specific functionality. Each of the computing devices 30 include one or more processor devices 32 and a memory 34.

The simulation environment 28 also includes one or more physical switch devices 36-1-36-M (generally, switch devices 36) that provide layer two switching functionality. The simulation environment 28 includes one or more storage devices 38-1-38-P (generally, storage devices 38). The computing system 12 is communicatively coupled to the simulation environment 28. Each computing device 30 may have physical connections to one or more of the switch devices 36 and may also be directly or indirectly communicatively coupled to the storage devices 38.

A user 40 may interact with the network generator 20 to define a desired network that has a specific plurality of components. The network generator 20 may store the defined network in configuration information 42 on a storage device 44. The configuration information 42, in this example, defines a network 46 designed by the user 40. The configuration information 42 identifies a plurality of components that make up the network 46, including, in this example, a dynamic host configuration protocol (DHCP) server 48, a controller routers 52-1 and 52-2 and four switches 54-1-54-4. The configuration information 42 identifies connections between the routers 52-1 and 52-2 and each of the four switches 54-1-54-4, as indicated by solid lines 55. In some implementations, the configuration information 42 may include, by way of non-limiting example, information regarding the means for bringing a network element online, and various settings of the network element. The configuration information 42 identifies a first virtual local area network (VLAN) 59-1 between the switches 54-1 and 54-3, as indicated by dashed lines. The configuration information 42 identifies a second virtual local area network (VLAN) 59-2 between the switches 54-2 and 54-4, as indicated by dashed lines.

The simulated network implementor 22 implements the network 46 identified by the configuration information 42 on the computing devices 30. In some embodiments, the computing devices 30-1-30-N each include corresponding software defined network (SDN) layers 56-1-56-N and corresponding network function virtualization (NFV) layers 58-1-58-N. The SDN layer 56 includes technology that uses software-based controllers and/or application programming interfaces (APIs) to communicate with underlying hardware infrastructure and direct traffic on a network. SDN is an architecture that abstracts the control plane from the data forwarding function. The network function virtualization layer 58 facilitates the virtualization of network services, such as routers, firewalls, load balancers, and the like, that are conventionally implemented in specialized hardware devices.

The embodiments herein utilize SDN and NFV, via the SDN layer 56 and the NFV layer 58, to implement a network 61 that corresponds to the network 46 identified by the configuration information 42 in the simulation environment 28.

In particular, the simulated network implementor 22 receives the configuration information 42 that defines the plurality of components that define the network 46, and causes a plurality of virtual network function (VNF) instances 60-1-60-4 to be generated on the computing devices 30-1-30-N. The VNF instances 60-1-60-4 correspond to components defined by the configuration information 42. In particular, the simulated network implementor 22 causes the generation of a controller VNF instance 60-1 to be generated on the computing device 30-1. The controller VNF instance 60-1 corresponds to the controller 50 of the defined network 46. The simulated network implementor 22 causes the generation of a DHCP server VNF instance 60-2 to be generated on the computing device 30-1. The DHCP server VNF instance 60-2 corresponds to the DHCP server 48 of the defined network 46. The simulated network implementor 22 causes the generation of a router VNF instance 60-3 to be generated on the computing device 30-1. The router VNF instance 60-3 corresponds to the router 52-1 of the defined network 46. The simulated network implementor 22 causes the generation of a router VNF instance 60-4 to be generated on the computing device 30-N. The router VNF instance 60-4 corresponds to the router 52-2 of the defined network 46.

The simulated network implementor 22 also, based on the configuration information 42, configures the VNF instances 60 as appropriate. The configuration may occur at the time of generation of the respective VNF instance 60 or may comprise additional commands submitted subsequent to the generation of the respective VNF instance 60. For example, the simulated network implementor 22 may provide commands similar to those illustrated below in Table 1 to generate and configure the router VNF instance 60-3 on the computing device 30-1 to utilize an inbound interface on one of the switch devices 36 and utilize an outbound interface on four of the switch devices 36. The four switch devices 36 correspond to the switches 54-1-54-4 in the network 46.

TABLE 1

OpenFlow Protocol
Define router
{CPU==2.2 GHZ
Line speed == 2 Gbps
Interface S0/1 inbound
Interface S1/1 outbound
Interface S1/2 outbound
Interface S1/3 outbound
Interface S1/4 outbound}

As another example, the simulated network implementor 22 may submit commands similar to those illustrated below in Table 2 to the router VNF instance 60-3 to generate and configure a VLAN that corresponds to the VLAN 59-1. In some embodiments, the simulated network implementor 22 may utilize the NETCONF protocol to implement the VLAN.

TABLE 2 create vlan for users between switch 1 and 3
Def Func_vlan( )
Switch 1# config terminal
interface x0/x
switchport mode access
switchport mode access vlan y After the network 46 is implemented in the simulation environment 28, the network tester 24 may obtain testing data 62 and testing criteria 64, and submit the testing data 62 to the network 61. The network tester 24 receives results from the testing data 62 and, based on the testing criteria 64 and the results, outputs network test results that can be used to determine whether the network 61 operates as expected and is ready to be implemented in a production environment 66, or requires additional configuration to improve performance prior to implementation in the production environment 66. The testing may comprise any suitable network tests, including, by way of non-limiting example, ping tests to verify connectivity, throughput tests, link capacity tests, and the like. The testing may also include application-level testing, such as, by way of non-limiting example, voice testing, security testing, and the like.

If the network test results indicate that the network 61 is ready to be implemented in the production environment 66, the production network implementor 26 causes the network 61 to be implemented in the production environment 66.

It is noted that, solely for purposes of illustration and ease of explanation, the network generator 20, the simulated network implementor 22, the network tester 24 and the production network implementor 26 are illustrated as separate components, but it will be appreciated that the functionality described herein could be implemented in a single component, or a number of components greater than four. Moreover, because the network generator 20, the simulated network implementor 22, the network tester 24 and the production network implementor 26 are components of the computing system 12, the functionality implemented by such components may be attributed to the computing system 12 generally. In examples where the network generator 20, the simulated network implementor 22, the network tester 24 and the production network implementor 26 comprise software instructions that program the processor devices 16 to carry out functionality discussed herein, functionality implemented by such components may be attributed herein to the processor devices 16. Finally, while for purposes of illustration and ease of explanation the network generator 20, the simulated network implementor 22, the network tester 24 and the production network implementor 26 are illustrated as being implemented on a single computing device 14 of the computing system 12, in other embodiments the components may be implemented on different computing devices 14 of the computing system 12.

Figure 2:
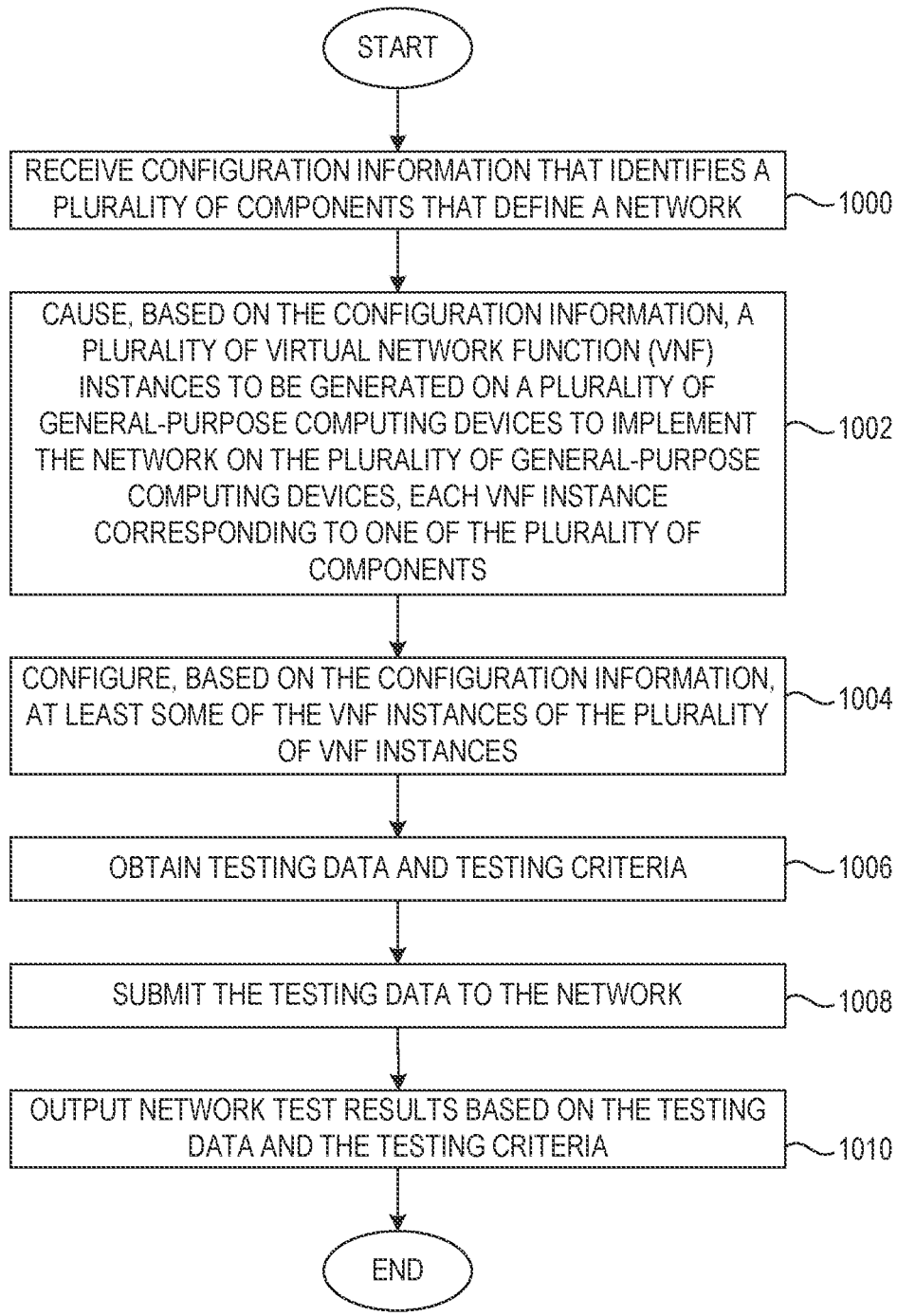
FIG. 2 is a flowchart of a method for automated network generation, validation and implementation in a production environment according to one embodiment.

FIG. 2 is a flowchart of a method for automated network generation, validation and implementation in a production environment according to one embodiment. FIG. 2 will be discussed in conjunction with FIG. 1. The computing system 12 receives the configuration information 42 that identifies the plurality of components that define the network 46 (FIG. 2, block 1000).

The computing system 12 causes, based on the configuration information 42, the plurality of virtual network function (VNF) instances 60 to be generated on the plurality of general-purpose computing devices 30 to implement the network 61 on the plurality of general-purpose computing devices 30, each VNF instance 60 corresponding to one of the plurality of components of the network 46 (FIG. 2, block 1002). The computing system 12 configures, based on the configuration information 42, at least some of the VNF instances 60 of the plurality of VNF instances 60 (FIG. 2, block 1004). The computing system 12 obtains the testing data 62 and the testing criteria 64 (FIG. 2, block 1006). The computing system 12 submits the testing data 62 to the network 61 (FIG. 2, block 1008). The computing system 12 outputs network test results based on the testing data 62 and the testing criteria 64 (FIG. 2, block 1010).

Figure 3:
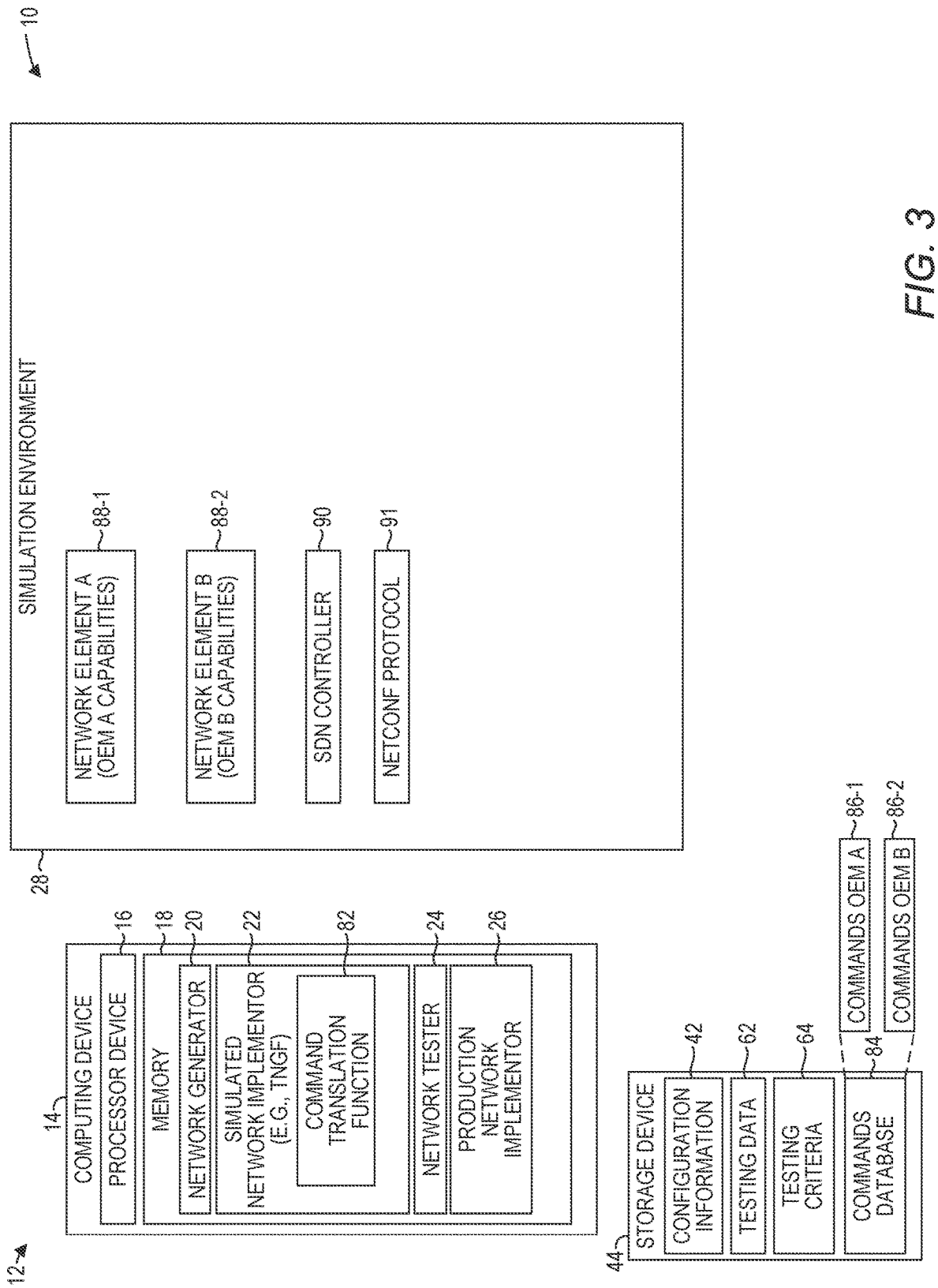
FIG. 3 is a block diagram illustrating a command translation function (CTF) that may be used to facilitate the generation of a simulated network according to one implementation.

FIG. 3 is a block diagram of the environment 10 illustrating a command translation function (CTF) 82 that may be used to facilitate the generation of a simulated network according to one implementation. In this example, the CTF 82 is illustrated as being part of the simulated network implementor 22, but in other implementations the CTF 82 may be separate from the simulated network implementor 22 and the simulated network implementor 22 may utilize the CTF 82 at an appropriate time when configuring the simulation environment 28.

In this example, requirements of the simulation environment 28, such as VLAN requirements, link speed requirements, latency requirements, and the like may be provided to the CTF 82. The CTF 82 accesses a commands database 84 to identify the appropriate commands for a given "flow", such as a particular path through a plurality of network components. The commands database 84 may comprise a plurality of different sets 86-1, 86-2 of commands for each different manufacturer of a network component 88-1, 88-2 that is being simulated. Such sets 86-1, 86-2 of commands may be updated by information obtained from the respective manufacturers as the manufacturers implement new components and/or functionality.

When a new component manufacturer is added, the CTF 82 need not be reprogrammed as the CTF 82 interfaces with the commands database 84 via a standard protocol, and accesses the appropriate set 86-1, 86-2 of commands based on the particular manufacturer of the network component being simulated. The CTF 82 may utilize the Simple Network Management Protocol (SNMP) protocol to configure the network components 88-1, 88-2 via an SDN controller 90.

As another example, the CTF 82 may utilize a programming language, such as Python, to call a function that corresponds to a desired function to be implemented and send the result to the SDN controller 90 utilizing a NETCONF protocol 91 for configuration of the network components 88-1, 88-2.

Figure 4:
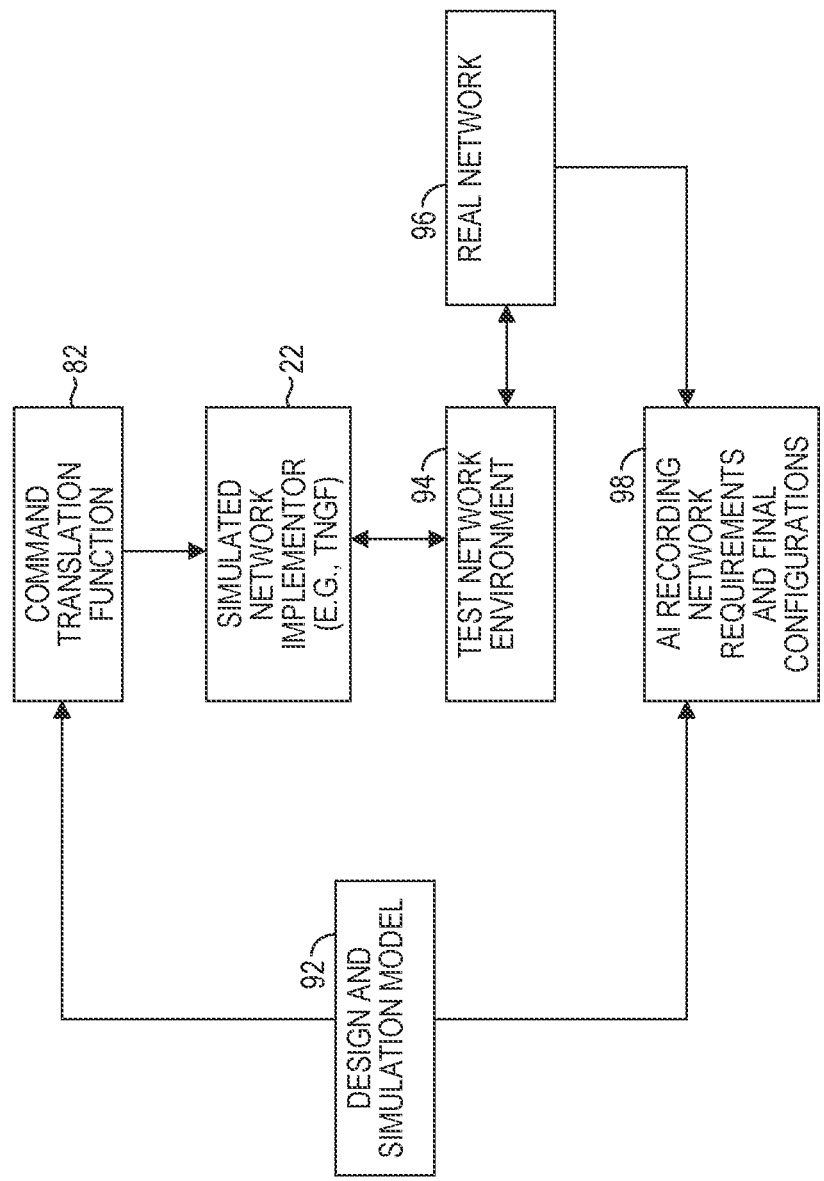
FIG. 4 is a block diagram illustrating the generation of a simulation environment according to another implementation.

FIG. 4 is a block diagram illustrating the generation of a simulation environment according to another implementation. In this example, the network generator 20 generates a simulation model 92. The simulated network implementor 22 (sometimes referred to herein as a test network generation function (TNGF)), interacts with the CTF 82, which in turn interacts with the simulation model 92 to generate a test network environment, such as the simulation environment 28. The test network environment may comprise a plurality of resources for emulating a test network, such as SDN servers that can be configured to be a switch, a router, an attenuator, end user emulators, or the like. A programming language with a library-like structure may be used to set this up.

Applications may be used to generate different tests to test the test network environment (block 94). If the tests are satisfactory, a real network 96 may be setup either automatically or semi-automatically. An artificial intelligence function 98 may record the configuration for future deployments as well as existing networks.

Figure 5:
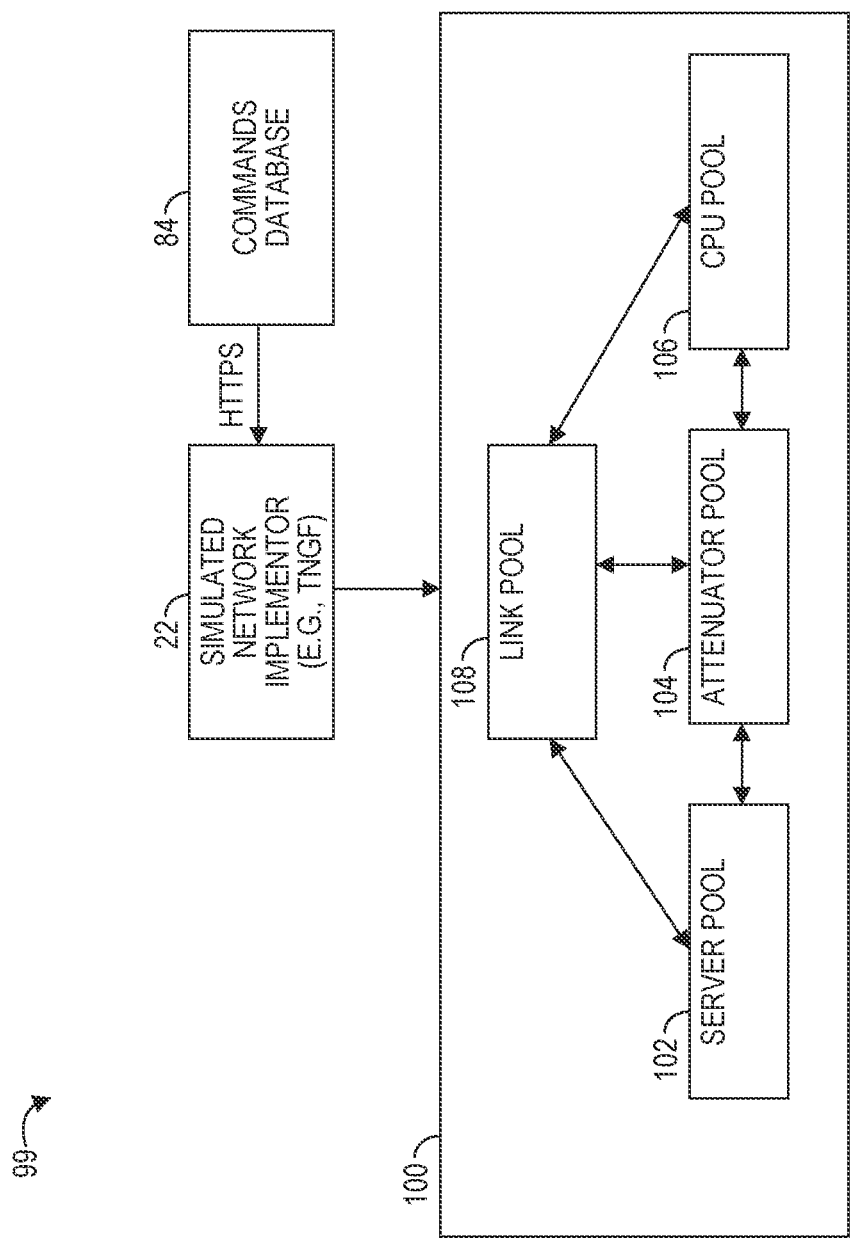
FIG. 5 is a block diagram of an environment illustrating mechanisms for generating a simulation environment according to another implementation.

FIG. 5 is a block diagram of an environment 99 illustrating mechanisms for generating a simulation environment 100 according to another implementation. The environment 99 includes the simulated network implementor 22 and the commands database 84. A simulation environment 100 includes a plurality of pools of resources, such as, by way of non-limiting example, a server pool 102 of servers, an attenuator pool 104 of attenuators, a processor device pool 106 of processor devices, and a link pool 108 of links.

Figure 6:
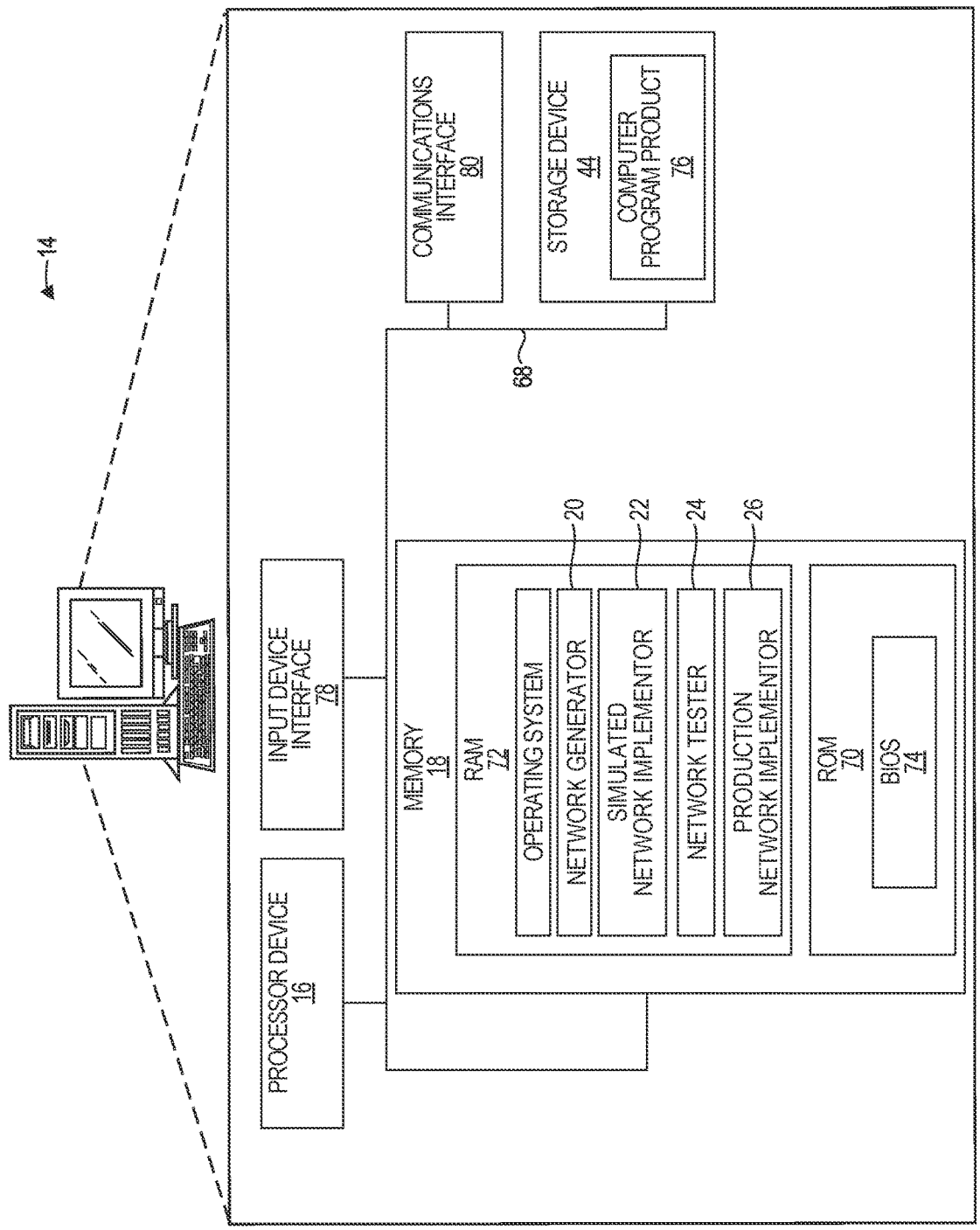
FIG. 6 is a block diagram of a computing device suitable for implementing embodiments disclosed herein.

FIG. 6 is a block diagram of a computing device 14 suitable for implementing examples according to one example. The computing device 14 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 14 includes the processor device 16, the memory 18, and a system bus 68. The system bus 68 provides an interface for system components including, but not limited to, the memory 18 and the processor device 16. The processor device 16 can be any commercially available or proprietary processor.

The system bus 68 may be any of several types of bus structures that may further interconnect to a memory bus (with or without a memory controller), a peripheral bus, and/or a local bus using any of a variety of commercially available bus architectures. The memory 18 may include non-volatile memory 70 (e.g., read-only memory (ROM), erasable programmable read-only memory (EPROM), electrically erasable programmable read-only memory (EEPROM), etc.), and volatile memory 72 (e.g., random-access memory (RAM)). A basic input/output system (BIOS) 74 may be stored in the non-volatile memory 70 and can include the basic routines that help to transfer information between elements within the computing device 14. The volatile memory 72 may also include a high-speed RAM, such as static RAM, for caching data.

The computing device 14 may further include or be coupled to a non-transitory computer-readable storage medium such as the storage device 44, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 44 and other drives associated with computer-readable media and computer-usable media may provide non-volatile storage of data, data structures, computer-executable instructions, and the like.

A number of modules can be stored in the storage device 44 and in the volatile memory 72, including an operating system and one or more program modules, such as the network generator 20, the simulated network implementor 22, the network tester 24, and the production network implementor 26, which may implement the functionality described herein in whole or in part.

All or a portion of the embodiments may be implemented as a computer program product 76 stored on a transitory or non-transitory computer-usable or computer-readable storage medium, such as the storage device 44, which includes complex programming instructions, such as complex computer-readable program code, to cause the processor device 16 to carry out the steps described herein. Thus, the computer-readable program code can comprise software instructions for implementing the functionality of the examples described herein when executed on the processor device 16.

An operator may also be able to enter one or more configuration commands through a keyboard (not illustrated), a pointing device such as a mouse (not illustrated), or a touch-sensitive surface such as a display device. Such input devices may be connected to the processor device 16 through an input device interface 78 that is coupled to the system bus 68 but can be connected by other interfaces such as a parallel port, an Institute of Electrical and Electronic Engineers (IEEE) 1394 serial port, a Universal Serial Bus (USB) port, an IR interface, and the like. The computing device 14 may also include a communications interface 80 suitable for communicating with other computing devices as appropriate or desired.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   receiving, by a computing system comprising one or more processor devices, configuration information that identifies a plurality of components that define a network;
   causing, by the computing system based on the configuration information, a plurality of virtual network function (VNF) instances to be generated on a plurality of general-purpose computing devices to implement the network on the plurality of general-purpose computing devices, each VNF instance corresponding to one of the plurality of components, wherein the plurality of VNF instances include a router VNF instance;
   configuring, by the computing system based on the configuration information, at least some of the VNF instances of the plurality of VNF instances, including configuring the router VNF instance to utilize a first interface of a plurality of interfaces of a physical switch for inbound traffic and configuring the router VNF instance to utilize a second interface of the plurality of interfaces of the physical switch for outbound traffic;

obtaining, by the computing system, testing data and testing criteria; submitting, by the computing system, the testing data to the network; and outputting network test results based on the testing data and the testing criteria.

2. The method of claim 1 further comprising:
generating, by the computing system based on the configuration information, a virtual local area network on the network.

3. The method of claim 2 wherein generating, by the computing system based on the configuration information, the virtual local area network on the network further comprises submitting, by the computing system based on the configuration information, one or more commands that utilize a NETCONF protocol to one or more VNF instances of the plurality of VNF instances to generate the virtual local area network on the network.

4. The method of claim 1 wherein the network is a software defined network.

5. The method of claim 1 further comprising generating, by the computing system based on the configuration information, a firewall on the network.

6. The method of claim 1 wherein the testing data comprises a throughput test.

7. The method of claim 1 wherein the testing data comprises a link capacity test.

8. The method of claim 1 wherein configuring the at least some of the VNF instances comprises configuring the at least some of the VNF instances to have internet protocol addresses.

9. The method of claim 8 wherein the testing data comprises a plurality of ping tests between the VNF instances.

10. A computing system comprising:
one or more processor devices of one or more computing devices, the one or more processor devices configured to:
receive configuration information that identifies a plurality of components that define a network;
cause, based on the configuration information, a plurality of virtual network function (VNF) instances to be generated on a plurality of general-purpose computing devices to implement the network on the plurality of general-purpose computing devices, each VNF instance corresponding to one of the plurality of components, wherein the plurality of VNF instances include a router VNF instance;
configure, based on the configuration information, at least some of the VNF instances of the plurality of VNF instances, including configuring the router VNF instance to utilize a first interface of a plurality of interfaces of a physical switch for inbound traffic and configuring the router VNF instance to utilize a second interface of the plurality of interfaces of the physical switch for outbound traffic;
obtain testing data and testing criteria;
submit the testing data to the network; and output network test results based on the testing data and the testing criteria.

11. The computing system of claim 10 wherein the one or more processor devices are further configured to:
generate, based on the configuration information, a virtual local area network on the network.

12. The computing system of claim 11 wherein to generate, based on the configuration information, the virtual local area network on the network, the one or more processor devices are further configured to submit, based on the configuration information, one or more commands that utilize a NETCONF protocol to one or more VNF instances of the plurality of VNF instances to generate the virtual local area network on the network.

13. A non-transitory computer-readable storage medium that includes executable instructions configured to cause one or more processor devices to:
receive configuration information that identifies a plurality of components that define a network;
cause, based on the configuration information, a plurality of virtual network function (VNF) instances to be generated on a plurality of general-purpose computing devices to implement the network on the plurality of general-purpose computing devices, each VNF instance corresponding to one of the plurality of components, wherein the plurality of VNF instances include a router VNF instance;
configure, based on the configuration information, at least some of the VNF instances of the plurality of VNF instances, including configuring the router VNF instance to utilize a first interface of a plurality of interfaces of a physical switch for inbound traffic and configuring the router VNF instance to utilize a second interface of the plurality of interfaces of the physical switch for outbound traffic;
obtain testing data and testing criteria; submit the testing data to the network; and
output network test results based on the testing data and the testing criteria.

14. The non-transitory computer-readable storage medium of claim 13 wherein the instructions further cause the one or more processor devices to:
generate, based on the configuration information, a virtual local area network on the network.

15. The non-transitory computer-readable storage medium of claim 14 wherein to generate, based on the configuration information, the virtual local area network on the network, the instructions further cause the one or more processor devices to submit, based on the configuration information, one or more commands that utilize a NETCONF protocol to one or more VNF instances of the plurality of VNF instances to generate the virtual local area network on the network.

* * * * *